United States Patent [19]

Lapidus

[11] 4,281,249
[45] Jul. 28, 1981

[54] STEPPED SCANNER IMAGING SYSTEM

[75] Inventor: Stanley N. Lapidus, Bedford, N.H.

[73] Assignee: The Machlett Laboratories, Incorporated, Stamford, Conn.

[21] Appl. No.: 111,558

[22] Filed: Jan. 14, 1980

[51] Int. Cl.³ .............................................. G01T 1/20
[52] U.S. Cl. .............................. 250/363 S; 250/366; 250/369
[58] Field of Search ................... 250/363 S, 366, 369, 250/446, 447, 448, 449

[56] References Cited

U.S. PATENT DOCUMENTS

| | | | |
|---|---|---|---|
| 2,822,477 | 2/1958 | Kizaur | 250/447 |
| 3,793,520 | 2/1974 | Grenier | 250/363 S |
| 3,914,611 | 10/1975 | Stout | 250/369 |
| 4,012,636 | 3/1977 | Engdahl et al. | 250/363 S |

Primary Examiner—Alfred E. Smith
Assistant Examiner—Janice A. Howell
Attorney, Agent, or Firm—Richard M. Sharkansky; Joseph D. Pannone

[57] ABSTRACT

An imaging system includes a radiographic camera, a bed for supporting a subject in view of the camera, and a display. The camera provides X and Y coordinate signals of each radiographic event. The position of the bed relative to the camera is altered sequentially between each of a sequence of images provided by the camera. The sequentially occurring images are presented on the display, each image being positioned on the display in correspondence with the location of the bed relative to the camera. The coordinates of each image point presented on the display is equal to the sum of the respective X and Y coordinate signals from the camera with X and Y coordinate signals defining the location of the bed relative to the camera. The camera is electronically decoupled from the display during a movement of the bed relative to the camera from one location to the next location to prevent a smearing effect and a zippering effect within a composite image presented on the display.

13 Claims, 14 Drawing Figures

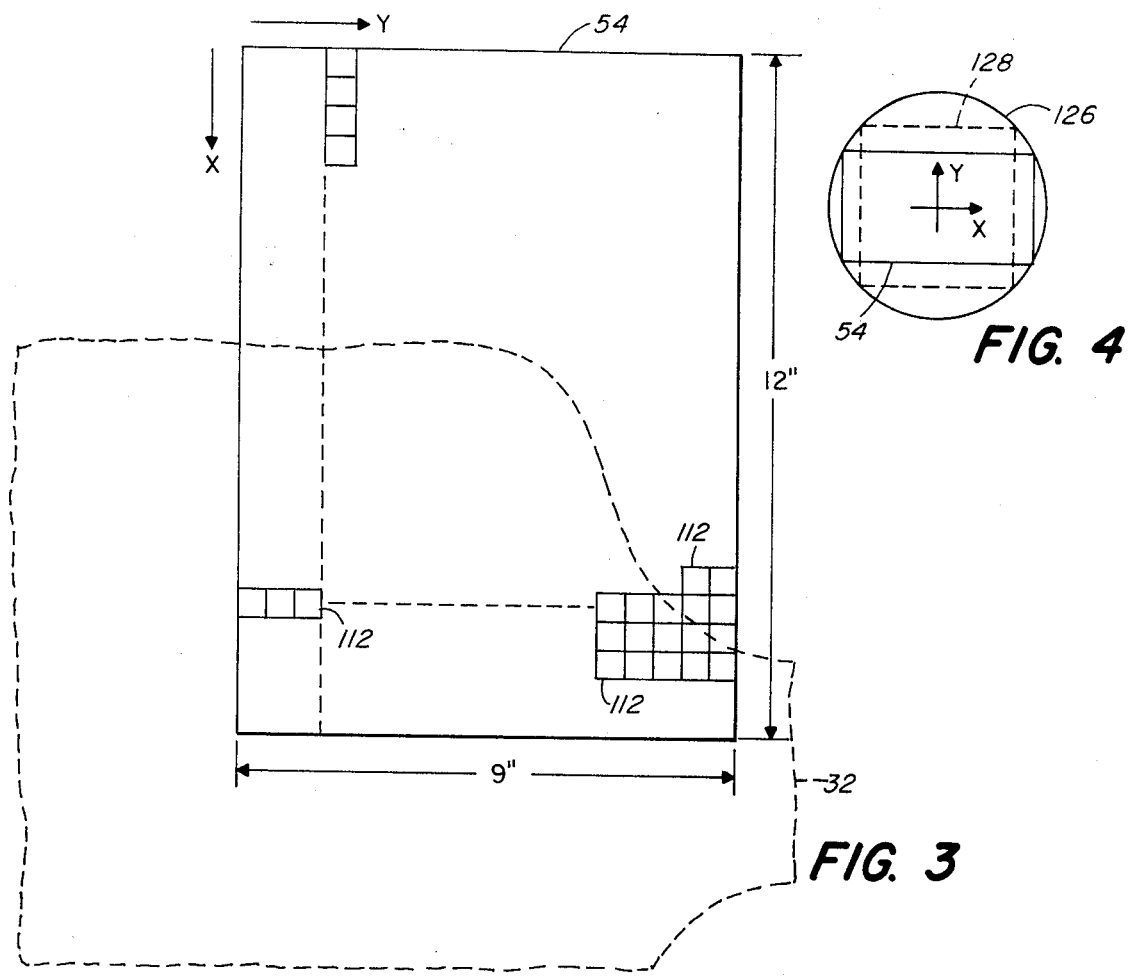
FIG. 3
FIG. 4
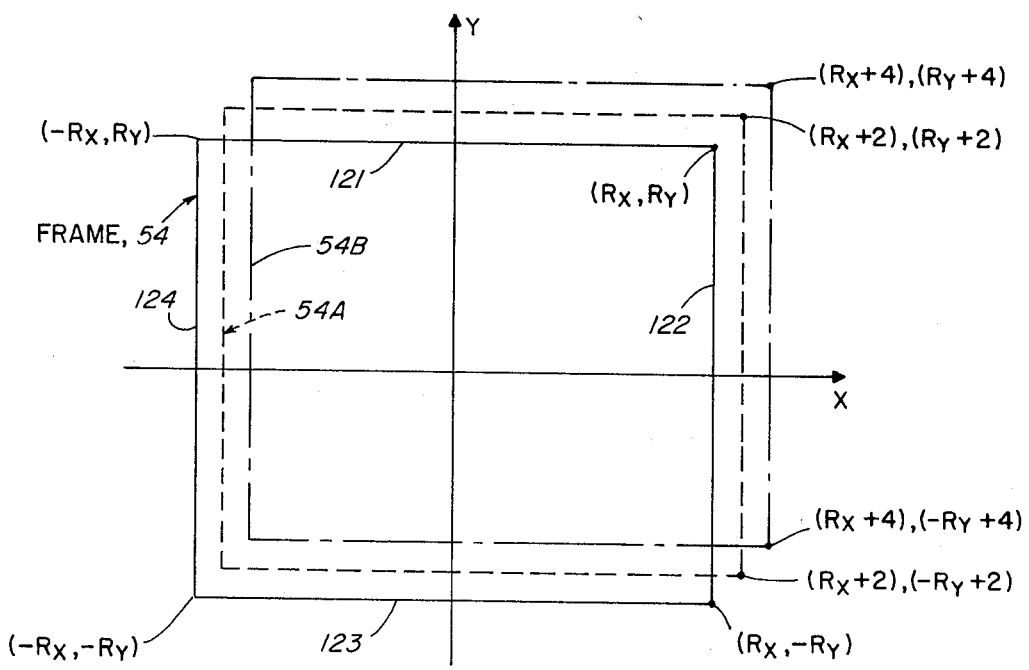
FIG. 5

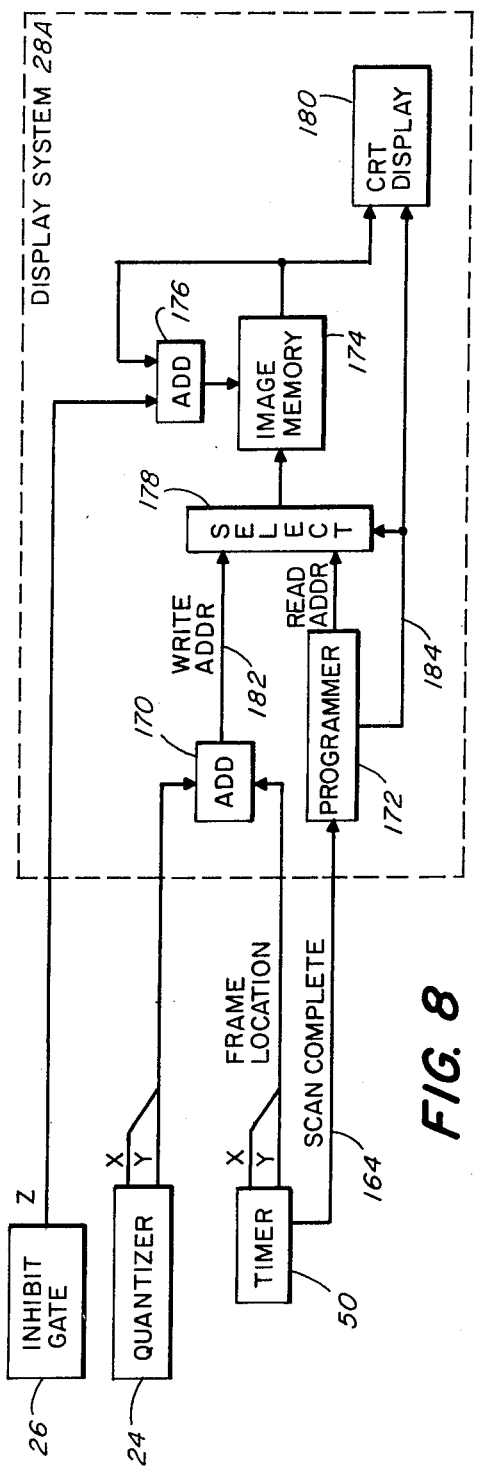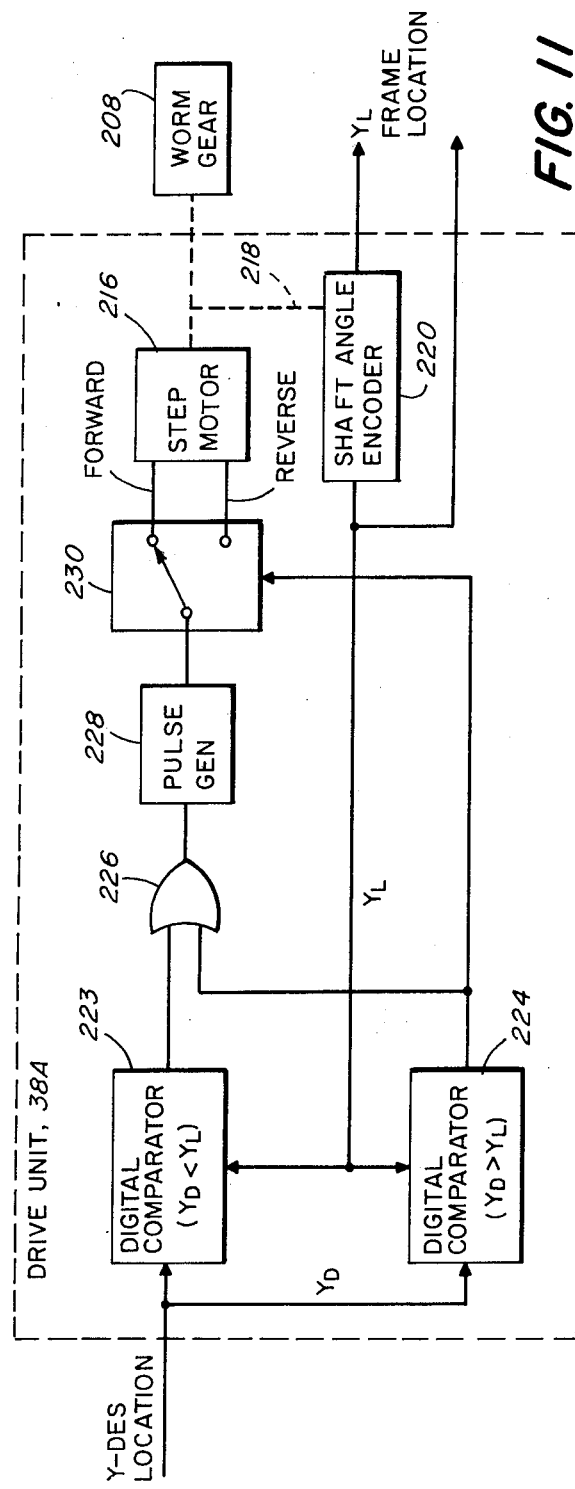

STEPPED SCANNER IMAGING SYSTEM

BACKGROUND OF THE INVENTION

This invention relates to radiographic imaging and, more particularly, to an imaging system for combining a set of component portions of an image to provide a composite image of a subject.

Radiographic imaging systems frequently employ a camera composed of a scintillator which is viewed by a set of photo-multipliers, the field of view of the camera being designated by a collimator. One such camera is described in the U.S. Pat. 3,914,611 which issued in the name of K. J. Stout on Oct. 21, 1975. The subject to be viewed may be smaller than, or larger than the viewing area as set forth by the collimator. For example, in the case of the imaging of a thyroid which has been doped with a radioactive tracer material, the thyroid is smaller than the viewing area of the typical radiographic camera so that the image can be obtained while the subject remains stationary relative to the camera. However, in the event that an image of the entire body of a human being is to be obtained, as is done for obtaining a scan of the skeleton, the subject is substantially larger than the viewing area of the camera so that a relative motion need be introduced between the camera and the subject to provide a scanning of the subject to obtain the complete image.

A problem arises in that, in the past, the relative motion introduced between the subject and the camera, during the scanning of the subject by the camera, has introduced a degradation of the resulting image. The degradation of the resulting image is characterized in some cases as a smearing, and in some cases as a "zippering" effect at the interface between two contiguous portions of the image. While various attempts have been made to compensate for the relative motion, these attempts have not been completely successful in avoiding the foregoing degradation with the result that the displayed image shows a loss of resolution in the case of images produced by the scanning of subjects which are relatively large as compared to the viewing area of the camera.

SUMMARY OF THE INVENTION

The aforementioned problem is overcome and other advantages are provided by a radiographic imaging system which employs a step-wise scanning of the subject. In accordance with the invention, a radiographic camera is inhibited from contributing points to the image of the subject during the intervals of time wherein the relative positions of the subject and the camera are being altered. The resultant image presented on the display is a composite of the individual images obtained by the camera at each of the sequential positions of the subject relative to the camera.

The imaging system, in one embodiment thereof, includes a cathode ray tube (CRT) showing a representation of the subject, the representation being imaged by a lens onto a photographic film plate which stores the individual points of the image as they are provided sequentially by the camera. In an alternative embodiment of the invention, there is provided a CRT, and a memory for storing the radioactive events as they are produced sequentially by the camera. In both embodiments of the invention, location signals identifying the coordinates of the location of the bed relative to the camera are provided, the location signals being summed together with the corresponding X and Y coordinate address signals of image points from the camera to provide a complete address of each image point within the composite image. With respect to the alternative embodiment of the invention, the complete address is also the location of a cell in the memory wherein a signal representing the corresponding image point is stored.

A pair of drive units is provided for positioning a bed supporting the subject relative to the camera, the positioning being accomplished in both X and Y coordinate directions. The electrical control circuitry for the drive units may be either of the open loop or closed loop configuration. In either case, the drive units hold the bed stationary relative to the camera at each of a sequence of locations, with the X and the Y coordinate values of the respective locations of the bed being applied to a summing circuit to accomplish the aforementioned summing of the coordinate signals of image points from the camera with the coordinate signals of the location of the bed. Since the points of the composite image are accumulated only while the bed is stationary relative to the camera, the data in the composite image is free of the relative motion and the zippering.

To accomplish the storing of data for each cell of the image, in both the case of the storage on the photographic film or in the memory, a set of four comparators for the X and the Y coordinates are coupled to the address signals of the camera for designating the bounds of each image. A pair of analog-to-digital converters quantize the magniutdes of the X and the Y coordinate addresses from the camera to designate the bounds of the individual cells within each image and, thereby, select the requisite cell of a set of contiguous cells into which data of an image point is to be stored. In the case of the memory, wherein a sequence of data points may be quantized to a single cell of the memory, a summing circuit is provided for adding the magnitudes of the successive image points in order to store in the memory cell a single quantity representing the sum of the individual radioactive events.

To provide a blending of the edges of the respective images in the composite image, electrical circuitry is provided with the comparators for periodically and incrementally altering the digital values of reference signals applied to the comparators with the result that the area viewed by the camera is made to reciprocate slightly, the reciprocation providing the required blending of the image points along the boundaries of the respective images. The blending can also be accomplished by altering the shapes of the boundaries of the respective images to provide an interlacing of the edge of one image with the edge of a contiguous image in the composite image.

BRIEF DESCRIPTION OF THE DRAWINGS

The aforementioned aspects and other features of the invention are explained in the following description taken in connection with the accompanying drawings wherein:

FIG. 3 shows a portion of the subject of FIG. 1 with a matrix of cells of an image superposed upon the subject;

FIG. 4 is a diagram showing a comparison of a rectangular and a square field of view obtained with a camera having a circular scintillator;

FIG. 5 shows an off-setting of the coordinate values applied to the reference terminals of comparators of the quantizer of FIG. 2 for a blending of the boundaries between contiguous images;

FIG. 8 is an alternative embodiment of the display system of FIG. 1 utilizing a memory for the storing of events in lieu of the film plate of FIG. 1;

FIG. 11 is a block diagram of a drive unit of FIG. 9;

DESCRIPTION OF THE PREFERRED EMBODIMENT

Figure 1:
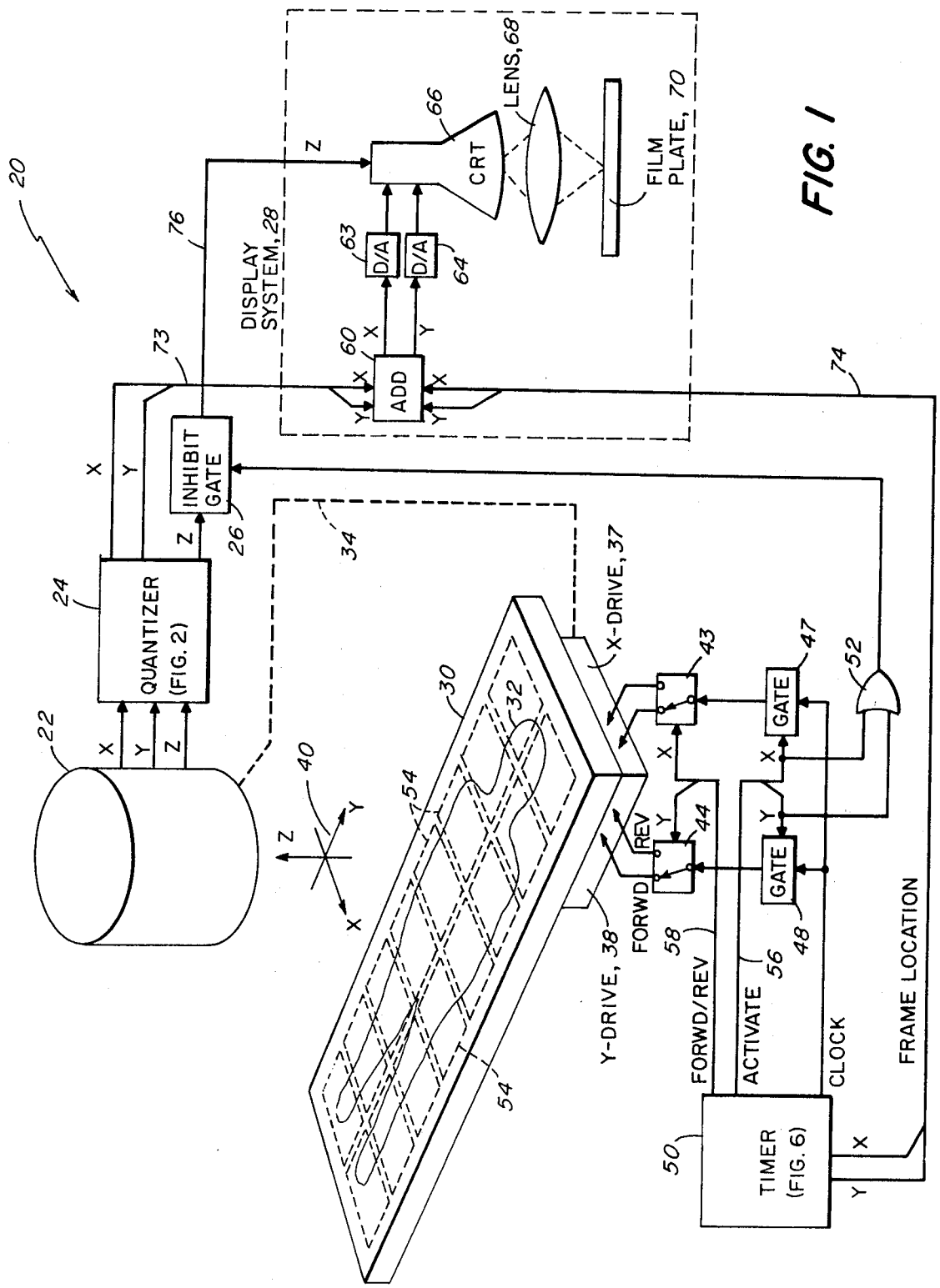
FIG. 1 is a stylized pictorial view of a radiographic imaging system incorporating the stepping of the bed and the inhibiting of camera signals while the bed is in motion in accordance with the invention.

Referring now to FIG. 1, there is seen a radiographic system 20 comprising a camera 22 such as an Anger camera, a quantizer 24, an inhibit gate 26, a display system 28, and a bed 30 supporting a subject 32 which is typically a human being. The bed is mechanically coupled to the camera 22 as is indicated by a dashed line 34 and is positioned relative to the camera 22 in X and Y coordinate directions by drive units 37 and 38. The orthogonal X & Y axes of the camera are aligned with those of the bed. The coordinate directions are shown in a reference frame 40. The operation of the the drive units 37-38 is accomplished by means of switches 43-44 and gates 47-48 which are activated by a timer 50 to transmit clock pulse signals to stepping motors (not seen in FIG. 1) of the drive units 37-38. Signals from the timer 50 are also utilized for activating the inhibit gate 26 via an OR gate 52, and also for providing the display system 28 with the coordinates of the position of the bed 30 relative to the camera 22.

In accordance with the invention, a position of the bed 30 relative to the camera 22 is altered sequentially by a series of steps wherein each step is equal to the length of an edge of the field of view, shown as a frame 54, which delineates the boundaries of an image of a portion of the subject 32 provided by the camera 22. To facilitate the presentation of the drawing in FIG. 1, the subject 32 is shown in outline form, and a matrix of the frames 54 is shown in dotted lines superposed upon the subject 32 and the bed 30. The frames 54 are contiguous, with each frame showing only a relatively small portion of the subject 32. The images designated ignated by each of the frames 54 are presented by the display system 28 in a composite image showing the complete subject 32.

While radiographic cameras of differing diameters may be utilized, the camera 22 utilized in the preferred embodiment provides, with a parallel hole collimator, a circular field of view having a diameter of sixteen and one half inches. The rectangular fields of view designated by the frames 54 are obtained electronically by means of the quantizer 24 which discards radioactive events detected by the camera 22 and having X and Y coordinates lying outside the viewing area designated by a frame 54. Accordingly, only those radioactive events falling within the single frame 54 being viewed by the camera 22 at a specific relative position between the bed 30 and the camera 22 is passed by the quantizer 24 via the gate 26 for presentation by the display system 28. In the preferred embodiment of the invention, a frame 54 measuring nine inches in the longitudinal or Y dimension and twelve inches in the transverse or X dimension has been utilized, rather than a square shaped frame, since the twelve inch transverse length permits the subject 32 to be imaged with only two passes of the bed 30 in the longitudinal direction. Eight frames 54 are taken in each pass, this providing a matrix of eight frames long by two frames wide.

The drive units 37-38 comprise stepping motors which drive through a worm gear to provide a two-dimensional transport, a typical mechanical configuration for such a transport being described hereinafter with reference to FIG. 10. As will be described in FIG. 6, the timer 50 provides clock pulses via the gates 47-48 respectively to the drive units 37-38, the clock pulses being steered via the switches 43-44, respectively, to the requisite terminals of the stepping motors to provide for forward or reverse rotation of the worm gear. Both the gates 47-48 and the switches 43-44 are activated by signals of the timer 50 in accordance with the specific frame 54 being photographed by the camera 22, so as to provide the sequential stepping from one of the frames 54 to the next frame 54. For example, the order of imaging may begin at one corner of the bed 30, and then proceed with stepping in the longitudinal direction until one column of the frames 54 is completed, this being followed by a stepping in the transverse direction to the second column followed by an imaging of the frames 54 in the second column.

A feature of the invention is the inhibiting of the transfer of event signals from the Z axis terminal of the camera 22 to the display system 28 by the gate 26 whenever the drive unit 37 or the drive unit 38 is in operation. The Z axis event signals are passed by the gate 26 to the display system 28 only during those intervals of time when the position of the bed 30 is fixed relative to that of the camera 22. Thereby, the image points from the various frames 54 bear an exact relationship to each other in terms of their coordinate positions so that each of these image points are correctly positioned relative to each other in the composite image presented by the display system 28. The inhibit gate 26 is activated via the OR gate 52 by either the X activation signal or the Y activation signal, which signals are provided by the timer 50 on line 56 for activating the gates 47-48 to operate the drive units 37-38. The line 56 is understood to contain both the X and the Y activation signals, the two signals being seen to fan out into the gates 47-48. Similarly, the forward-reverse control signals for both the switches 43-44 are understood to be provided on line 58 by the timer 50, the two signals being seen to fan into the switches 43-44 for operating the drive units 37-38, respectively.

The display system 28 is seen to comprise an adder 60, digital-to-analog converters 63–64, a cathode ray tube (CRT) 66, a lens 68 and a photographic film plate 70. The X and the Y coordinate axis signals of the camera 22 are converted within the quantizer 24 (as will be described subsequently with reference to FIG. 2) from analog signals to digital signals which are applied via a line 73 to the adder 60. The X and the Y frame location signals of the timer 50 are applied via the line 74 to the adder 60, the X and the Y signals being seen to fan out into two terminals of the adder 60. It is to be understood that the adder 60 comprises two sections, one for summing together the X coordinate signals of the lines 73–74, and the other section for summing together the Y coordinate signals on the lines 73–74. Since the signals on both the lines 73–74 are in a digital format, the addition of the adder 60 is accomplished digitally, and the output X and Y signals thereof are applied to the converters 63–64 to provide the analog deflection signals for the CRT 66. The Z axis signal on line 76 from the inhibit gate 26 provides an image point on the face of the CRT 66 upon the occurrence of a radioactive event in the subject 32, which event is detected by the camera 22. As noted hereinabove, the Z axis signals of only those events which occur within the boundaries of a frame 54 are coupled via the quantizer 24 to the inhibit gate 26 and, furthermore, only those Z axis signals which occur when the bed 30 is stationary relative to the camera 22 are coupled by the gate 26 to the display system 28. Light rays, identified by the legend 78, emanating from each image point appearing on the face of the CRT 66 are focussed by the lens 68 to provide the corresponding image point on the film plate 70.

In operation, therefore, the bed 30 with the subject 32 thereon is positioned sequentially through a set of predesignated locations relative to the camera 22 in accordance with signals provided by the timer 50 to the drive units 37–38. As the bed 30 remains stationary in each of its predesignated positions, radioactive events are detected by the camera 22, the camera 11 providing X and Y signals having magnitudes proportional to the X and Y coordinates of the event and a Z axis signal indicating the presence of such an event. The X, Y and Z signals are applied to the quantizer 24 which discards all Z axis signals having coordinate values of X and Y which lie outside the frame 54 to which the camera 22 is directed. The X and the Y coordinate signals from the quantizer are summed together with the X and Y coordinate signals identifying the location of the frame 54 to which the camera 22 is directed, the sum of these coordinate signals being applied by the adder 60 to the CRT 66 for deflecting the beam thereof to provide an image point on the face of the CRT 66 and an image point on the film plate 70 which correspond to the location of the event within the subject 32. For example, assuming that the subject 32 has ingested a radioactive tracer pharmaceutical, portions of the subject 32 are found to accumulate the radioactive pharmaceutical whereupon radioactive events in such portions of the subject 32 are detected by the camera 22. The Z axis signals of the quantizer 24 are discarded by the gate 26 during a repositioning of the bed 30 by the drive units 37 or 38, the signals being passed by the gate 26 only when the bed 30 is stationary relative to the camera 22. As the individual radioactive events occur, individual image points are obtained on the film plate 70, the film plate 70 serving as a storage medium for storing data of the image as the successive image points appear on the plate 70 to construct the composite image of the subject 32. The stepping motors of the drive units 37–38 are controlled by open loop circuitry wherein the stepping motors are energized by a predetermined number of clock pulses from the timer 50, as will be explained subsequently with reference to FIG. 6, to translate the bed 30 a predetermined distance from one of the frames 54 to the next frame 54. If desired, a closed loop control circuit may be utilized for the drive units as will be disclosed subsequently with reference to an alternative embodiment of a drive unit as shown in FIG. 11.

Referring now to FIGS. 2–5, the quantizer 24 is seen to comprise a clock 80, a counter 82, a gate 84, a digital inverter 86, two analog-digital converters 89–90, four sources 91–94 of reference signals, four adders 97–100, four comparators 101–104, and four gates 107–110. In the operation of the quantizer 24, the X and the Y signals from the camera 22 are applied, respectively, to the converters 89–90 which convert these signals from an analog format to a digital format, the digitally formatted signals appearing at the output terminals of the quantizer 24 for transmittal to the display system 28. In addition, the X signal is coupled from the converter 89 to input terminals of the comparators 101–102 while the Y signal from the converter 90 is coupled to input terminals of the comparators 103–104. Reference signals for the comparators are coupled from the reference signals sources 91–94 respectively via the adders 97–100 to the reference signal input terminals of the comparators 101–104, respectively. The converters 89–90 quantize the X and the Y signals to seven-bit digital signals wherein each bit designates a resolution element as bounded by a cell 112 of a frame 54 as is portrayed in FIG. 3. The comparators 101–104 compare the values of the X and the Y signals to the reference signals from the adders 97–100 to determine whether the X and the Y coordinate addresses of a radioactive event fall within the frame 54 as is seen in FIGS. 3–5.

A blending of the boundaries between contiguous frames 54 of FIG. 1 is accomplished by electronically shifting the boundaries of the frame 54 by a relatively small percentage, preferably less than five percent, of the length of a side of the frame 54 as is seen in FIG. 5. In FIG. 5, the shifting of the frame locations is exaggerated to more readily portray the successive changes in the positions of a frame 54. To accomplish the blending, a shifting signal is applied via line 114 to each of the adders 97–100, the adders 97–100 adding the magnitude of the shifting signal on line 114 to the value of the reference signals as are provided by the sources 91–94 whereby the reference signals applied to each of the comparators 101–104 are seen to shift in magnitude periodically with increments as are portrayed in a graph 116 shown adjacent the line 114. As seen in the graph 116, the shifting signal has, in the preferred embodiment of the invention, three possible values, namely, 0, 2 and 4. Each of these foregoing values of the shifting signal is maintained over a time interval of 1/30 second with the waveform of the shifting signal repeating periodically with a period of 1/10 second. To produce the shifting signal on line 114, the counter 82 counts clock pulses from the clock 80 with a modulo-5 count. A three-bit output signal of the counter 82 is portrayed on three separate lines which couple the output signal to the gate 84, one of the lines being labeled LSB to designate the least significant bit, while the third of the lines is labeled MSB to designate the most significant bit. The gate 84 is activated by the LSB as coupled via the inverter 86 to pass the three-bit signal to the line 114. Since the gate 84 is activated only when the LSB is 0, the gate 84 inhibiting the passage of the three-bit signal when the LSB is 1, only the digital signals representing the values 0, 2, and 4 appear on line 114.

The Z axis signal from the camera 22 is seen to be coupled via the four gates 107–110 of the quantizer 24 to the inhibit gate 26 of FIG. 1. Each of the gates 107–110 and its corresponding one of the comparators 101–104 correspond to one of the four sides of the frame 54 as portrayed in FIG. 5. The X and the Y reference frame of FIG. 5 provides addresses relative to the center of the frame 54 while the reference frame 40 of FIG. 1 is understood to designate X and Y addresses relative to a corner of the bed 30. The comparator 101 and the gate 107 function to determine whether or not an event lies above or below the line 121 in FIG. 5, the line 121 being seen to be a side of the frame 54. Similarly, the comparator 102 and gate 108 function to determine whether a radioactive event occurs to the right or left of the line 122, the comparator 103 and the gate 109 determining whether a radioactive event occurs below or above the line 123, and the comparator 104 and the gate 110 determining whether a radioactive event occurs to the left or the right of the line 124. The values of the reference signals of the sources 91–94 in FIG. 2 (+Rx, −Rx, +Ry, −Ry) are also seen at the vertices of the frame 54 in FIG. 5. Thus, the line 121 is seen to have a value of $Y = Ry$, with similar comments applying to the lines 122–124. Thus, with reference to the gates 109–110, when the Y signal from the camera 22 falls below the lines 121 and above the line 123, the comparators 103 and 104 activate the gates 109–110 to pass the Z axis signal to the gate 108. Similarly, with respect to the gates 107 and 108, when the X signal from the camera 22 falls to the left of the line 122 and to the right of the line 124, the comparators 101–102 activate the gates 107–108 to be conductive to the Z axis signal. When all the gates 107–110 are in a conductive state, this indicating that the coordinates of a radioactive event fall within the frame 54, then the Z axis signal is coupled to the inhibit gate 26.

With reference to FIG. 3, each of the cells 112 may have either a square shape or a rectangular shape such as the rectangular shape of the frame 54. Since each of the converters 89–90 are seven-bit converters providing 128 possible values of output signal, there are a sufficient number of quantization levels of each converter 89–90 to provide for 100 cells along a side of the frame 54 plus four additional cells to accommodate the shifting of the frame as shown in FIG. 5. This permits a resolution within one percent of the dimensions of the frame 54.

With reference to FIG. 4, there is seen a circular outline of the viewing area 126 of the camera 22 of FIG. 1, FIG. 4 showing the frame 54 superposed upon the viewing area 126. Also shown in dashed lines is a square shaped frame 128 which designates the area which would be imaged in the event that a square frame rather than the rectangular frame were utilized. As can be seen in FIG. 4, the transverse direction of the frame 54 is longer than the corresponding dimension of the square shaped frame 128 so that, as has been noted hereinabove, the body of a human subject can be imaged with two passes in the movement of the bed relative to the camera 22. As seen in FIG. 3, the transverse dimension of the frame 54 is twelve inches, this giving a total of twenty-four inches for a transverse dimension of the composite image of the subject, the twenty-four inches being sufficient to encompass the shoulders of the human subject. However, with the reduced transverse dimension available with a square shaped frame 128, the edges of the shoulders of a relatively large person would be excluded from the composite image so that, either a larger diameter camera than the camera 122 need be utilized, or a diverging collimator be utilized for the camera to provide a larger frame or, alternatively, three passes need be made in the scanning of the subject 32 for a total of three columns in the matrix of frames portrayed in FIG. 1.

Figure 2:
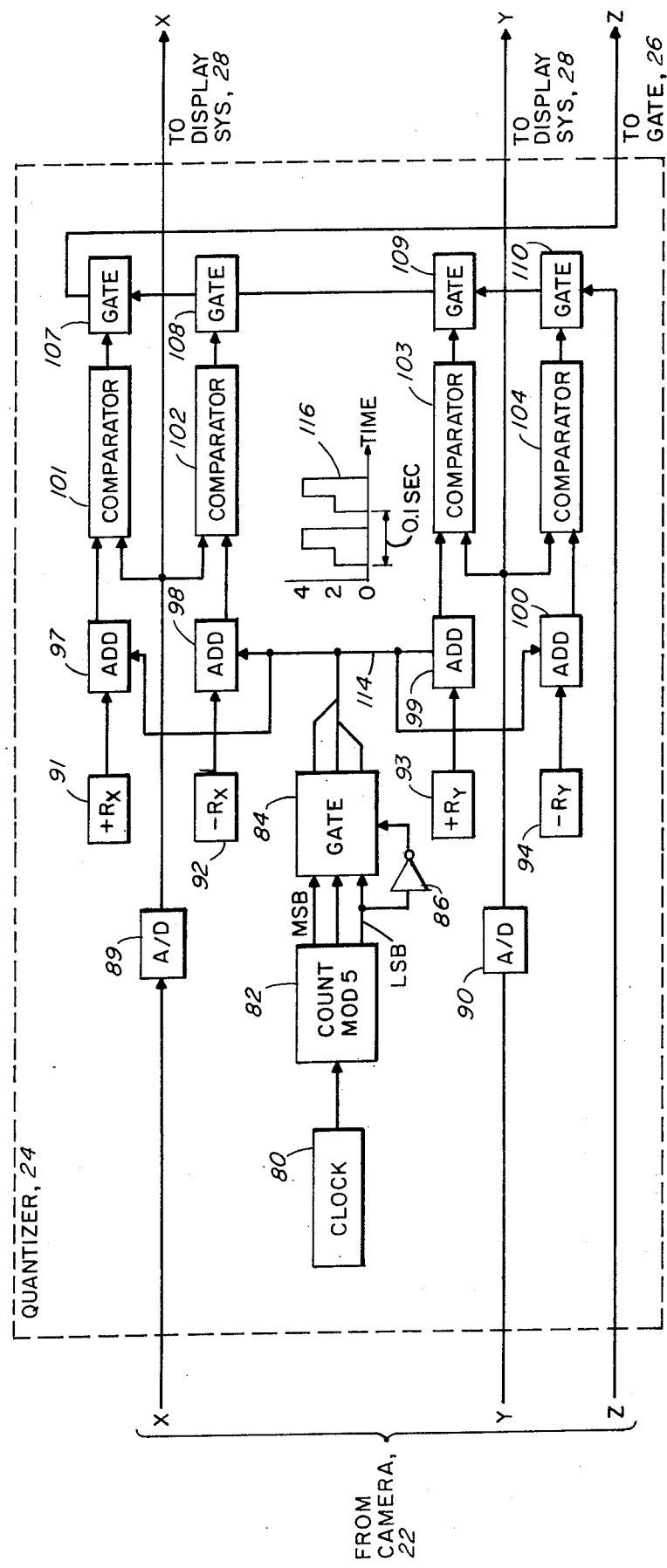
FIG. 2 shows a block diagram of a quantizer of the camera signals of FIG. 1.

With reference to FIG. 5, it is noted that the aforementioned 1/30 second viewing time for the frame 54 prior to the shifting of the frame 54 by the shifting signal on line 114 of FIG. 2 is much less than the total exposure duration for forming a single image by the camera 22. In FIG. 5, the first shift of the frame 54 is designated by a frame 54B. Thus, many image points are accumulated with each of the frames 54, 54A, and 54B during the exposure of a single image by the camera 22. The same process applies to the contiguous frames 54 of FIG. 1 with the result that, in the composite image presented on the film plate 70 of FIG. 1, image points near the boundary of a frame 54 are accumulated from images taken at two different positions of the bed 30 relative to the camera 22. This provides for a blending of the edges of the respective images without any loss in position data of the image points due to the fact that all of the image points have been taken when the bed 30 is stationary relative to the camera 22.

Figure 6:
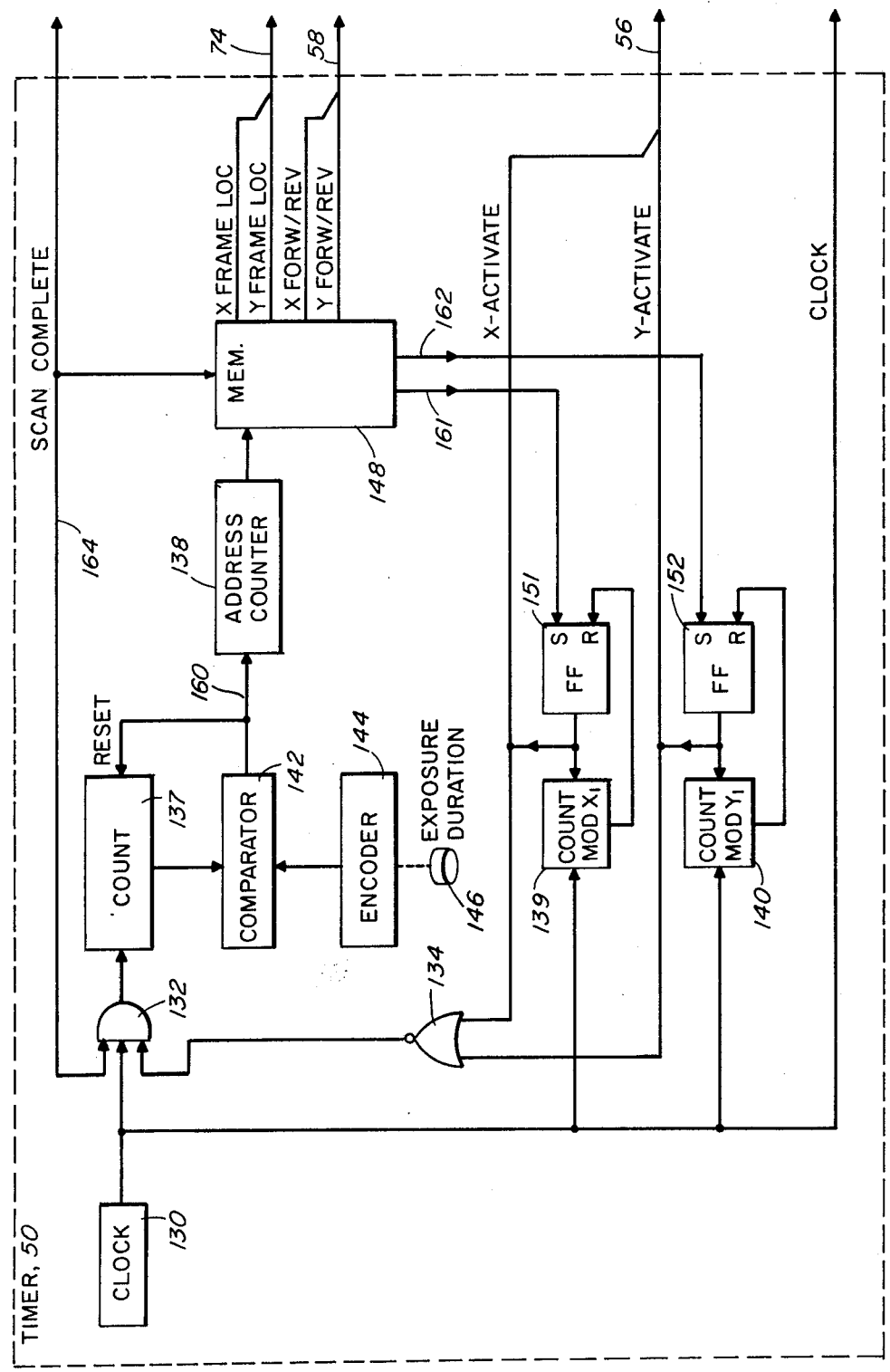
FIG. 6 is a block diagram of a timer of FIG. 1.

Referring now to FIG. 6, the timer 50 is seen to comprise a clock 130, an AND gate 132, a NOR gate 134, four counters 137–140, a comparator 142, an encoder 144 having a knob 146 thereon, a memory 148, and two flip-flops 151–152. The timer 50 is driven by the clock 130 during the scanning of the subject 32 in FIG. 1, the clock 130 being disabled by a scan-complete signal from the memory 148 at the conclusion of the scanning operation. The duration of the exposure time for the forming of an image of one of the frames 54 in FIG. 1 is provided by the counter 137, the comparator 142 and the encoder 144. The counter 137 counts clock pulses coupled from the clock 130 by the AND gate 132. The count of the counter 137 is compared by the comparator 142 with a digital number of the encoder 144. A number, representing the exposure time, is manually set in the encoder 144 by the knob 146. When the count of the counter 137 reaches the value of the number in the encoder 144, the comparator 142 signals the equality by a signal on line 160 which resets the counter 137. Upon the reseting of the counter 137, the counter 137 is then ready to begin the counting of the exposure for the next one of the frames 54 of FIG. 1.

The memory 148 provides the frame location signals on line 74, the forward/reverse signals on line 58, and initiates the activation signals on line 56 (also seen in FIG. 1) by trigger signals on the lines 161–162. The counter 138 addresses the memory to provide the foregoing signals, the counter 138 counting the signals on line 160 provided by the comparator 142. Thus, at the conclusion of each exposure interval for the generation of an image within a frame 54 of FIG. 1, the conclusion being signaled by the comparator on line 160, the count of the address counter 138 advances and updates the address of the memory 148 to correspond with the next one of the frames 54 to be imaged. In the case of the sixteen frames 54 of FIG. 1, there are provided sixteen separate addresses by the counter 138 to the memory 148, one address corresponding to each of the frames 54. Thus, on line 74, the memory 148 provides the X and the Y coordinates of the location of the specific frame 54 being imaged. The scanning procedure is the same regardless of how many frames 54 are actually utilized. For example, in the event that it is desired to provide a composite image of a child, a total of eight frames 54 in a matrix of two rows of four frames each may suffice to provide a composite image of the entire child.

Figure 7:
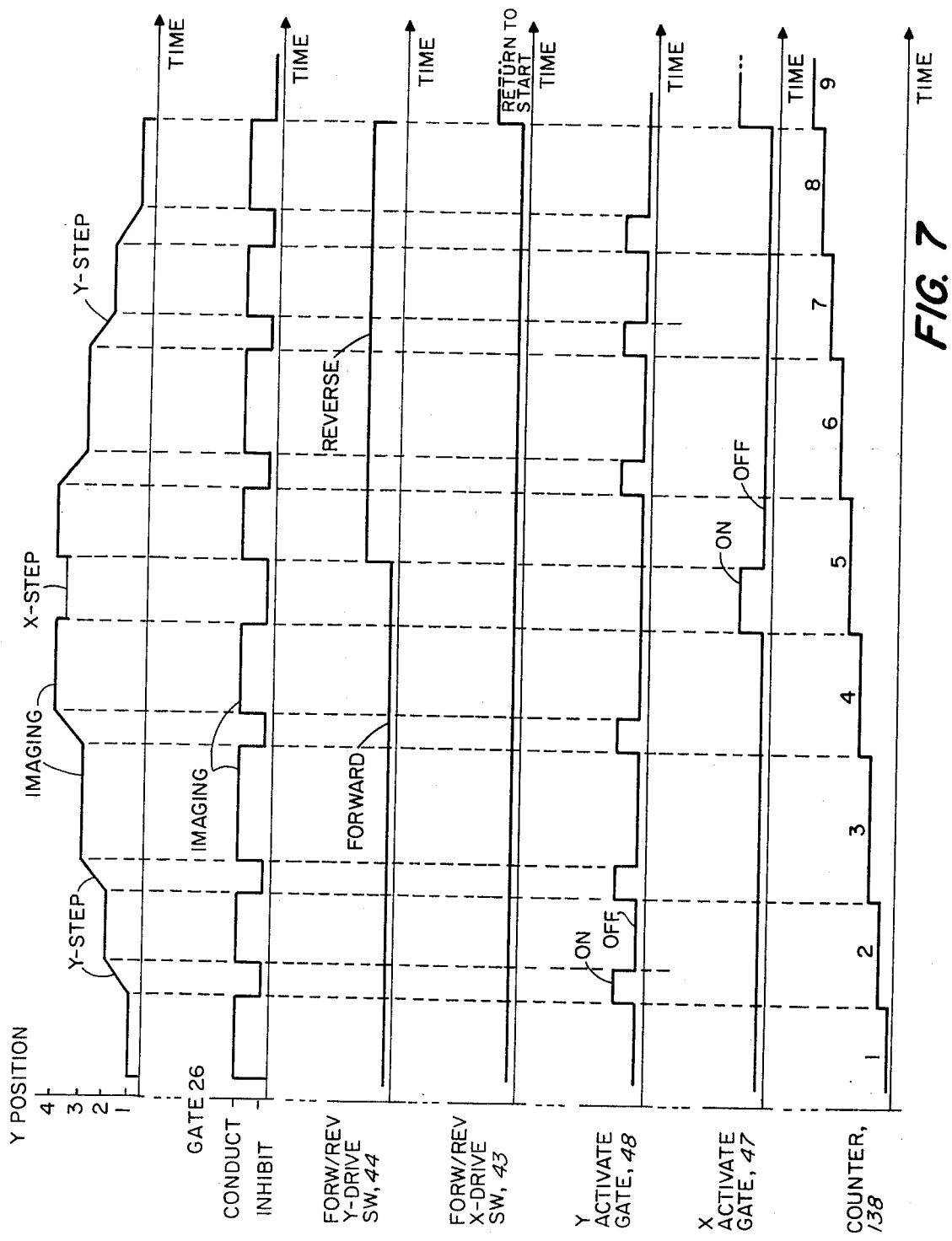
FIG. 7 presents timing diagrams showing the temporal relationship between the positioning of the bed and the gating of imaging signals from the camera of FIG. 1.

A timing diagram for the exemplary situation of the eight frame situation is shown in FIG. 7 wherein the first graph shows the Y coordinate of each of the four frames in a column of the matrix on the bed 30, this being followed by a stepping in the X direction to the second column whereupon the scanning continues through the remaining four frames. The first graph of FIG. 7 shows a succession of plateaus representing the intervals of time when the bed 30 of FIG. 1 is stationary, these plateaus being separated by ramps indicating those intervals of time when the bed 30 is advancing its position to the next one of the frames 54.

Referring to the second graph of FIG. 7, the inhibit gate 26 of FIG. 1 is seen to be in a state of conduction, for conducting the Z signal of the camera 22 whenever the bed 30 is stationary relative to the camera 22. The gate 26 inhibits the passage of the Z signals during movement of the bed 30 as is seen by the first and second of the graphs, the inhibit portions of the second graph being in registration with the ramps of the first graph. The signals which operate the switches 44 and 43 in FIG. 1 are shown in the next two graphs, these graphs being in registration with the first graph. Thus, the switch for the Y drive 38 is set for reverse operation beginning with the second portion of the first graph wherein the Y coordinate of the frame being imaged is brought back towards the foot of the bed 30. The X drive unit 37 operates in the forward direction to transfer the scan line from the first column to the second column of the frames 54, the switch 43 being set for reverse operation at the conclusion of the scan to bring the bed 30 back to its original position. The signals which activate the gates 48 and 47 of FIG. 1 are shown in the next two graphs of FIG. 7, the gate 48 being turned on to conduct the clock pulses during intervals coinciding with the ramps of the first graph. Similarly, the gate 47 is turned ON to pass clock pulses during a time interval corresponding with the mid portion of the first graph wherein the bed 30 is being shifted transversely from the first scan column to the second scan column.

The last graph of FIG. 7 shows the count of the counter 138, the count being seen to advance monotonically during the scan cycle to successively address the memory 148 to provide the functions of each of the foregoing graphs. With reference to FIG. 6, and with reference to the first ramp of the first graph of FIG. 7, as the count of the counter 138 is applied to the memory 148, the memory 148 provides a trigger on line 162 which sets the flip-flop 152 to provide the pulse signal on line 56 for the Y gate 48 as seen in the fifth graph of FIG. 7. The output signal of the flip-flop 152 also activates the counter 140 to count pulse signals of the clock 130, the counter 140 counting modulo, $Y_1$, whereupon the counter 140 resets itself to 0 and also applies a reset signal to the reset terminal of the flip-flop 152 to terminate the Y activating signal to the gate 48. The foregoing procedure with the flip-flop 151 and the counter 139 is repeated for each of the ramps of the first graph of FIG. 7 to produce each of the pulse signals appearing on the fifth graph of FIG. 7.

With reference to the last graph of FIG. 7, and with reference to the fifth count of the counter 138, the addressing of the memory 148 calls for the movement of the bed 30 in the transverse direction. Accordingly, the memory 148 provides a trigger signal on line 161 which triggers the flip-flop 151 to produce the X activation signal for the gate 47 as is shown in the sixth graph of FIG. 7. The flip-flop 151 and the counter 139 function in the same manner as has been described with reference to the flip-flop 152 and the counter 140. Accordingly, the counter 139 counts the predesignated number of clock pulses from the clock 130 for energizing the X-drive unit 37 to position the bed 30 in the transverse direction. At the conclusion of the predesignated number of clock pulses, namely $X^1$, the counter 139 resets the flip-flop 151 terminating the signal of the sixth graph to shut OFF the gate 47.

Again with reference to the first graph of FIG. 7, the duration of the exposure interval is indicated by the plateaus of the graph and, accordingly, the counter 137 of FIG. 6 which operates to provide the desired duration of the exposure interval is delayed during the intervals when the bed 30 is being moved. This is in accordance with the first graph of FIG. 7 wherein, as noted hereinabove, the ramp intervals separate the plateaus. Accordingly, the X and the Y activating signals of line 56, provided respectively by the flip-flops 151 and 152, are also applied via the NOR gate 134 to the AND gate 132. Thereby, when either the X or the Y activation signals are present on line 56, the gate 132 is rendered nonconducting to the clock pulses of the clock 130. Thereby, the operation of the counter 137 is delayed until the completion of the operation of the drive unit 37 or 38 of FIG. 1. Again, with reference to the final graph of FIG. 7, at the ninth count of the counter 138, the memory 148 activates the scan-complete signal on line 164 to discontinue the passage of clock pulses by the gate 132 to the counter 137, thereby terminating the scanning procedure. A coupling (not shown in the drawings) of the scan-complete signal on line 164 to the camera 22 may be utilized for shutting down the camera 22 at the completion of the scanning procedure. An additional function of the scan-complete signal on line 164 will be seen in an alternative embodiment of the display system in FIG. 8.

Referring now to FIG. 8, an alternative embodiment of the display system 28 is described, the alternative embodiment being identified by the legend 28A. The display system 28A of FIG. 8 is coupled to the inhibit gate 26, the quantizer 24, and the timer 50 which were previously seen coupled to the display system 28 of FIG. 1. The display system 28A comprises an adder 170, a programmer 172, a selector switch 174, an adder 176, a memory 178, and a CRT display 180.

With respect to the operation of the system 28A, it is recalled that, with reference to the display system 28 of FIG. 1, the film plate 70 serves as a medium for the storage of the sequentially occurring image points for the corresponding radiographic events. In the display system 28A of FIG. 8, the storage of the signals representing the radiographic events is accomplished in the memory 178. The adder 170 of FIG. 8 functions in the same manner as the adder 60 of FIG. 1 to provide digitally formatted X and Y signals on line 182 which identify the location of each image point, and which are applied via the switch 174 to address a cell in the memory 178 for the storage of the Z signal designaling the occurrence of the radioactive event. Each Z signal is coupled via the adder 176 to the memory 178 so that, in the event that the memory 178 is being addressed to store the Z signal at a cell in which a Z signal has been previously stored, the previously stored Z signal is added to the present Z signal by the adder 176 to provide a sum of Z signals having a common address. For example, with reference to the cells 112 of FIG. 3, in the event that several radioactive events occur sufficiently close together to fall within a single one of the cells 112, then the corresponding cell in the memory 178 stores the sum of these signals. This corresponds to a brightening of the film plate 70 of FIG. 1 in the event that several image points are imaged at approximately the same location on the film plate 70.

At the conclusion of the scanning operation, the scan-complete signal on line 164 is applied to the programmer 172. The programmer 172, which may include a clock and a program counter which counts pulses from the clock (not shown), activates the switch 174 to select address signals provided by the programmer 172 for reading out data from the memory 178 into the display 180. The signal from the programmer on line 184, which is applied to the switch 174, is also applied to the display 180 for activating the display 180 to present an image from the image points stored within the memory 178. The reading out of data from the memory 178 in response to the read address of the programmer 172 can be accomplished cyclically as is well known in the display art, so that the image comparing on the CRT of the display 180 may be readily viewed by an observer.

Figure 9:
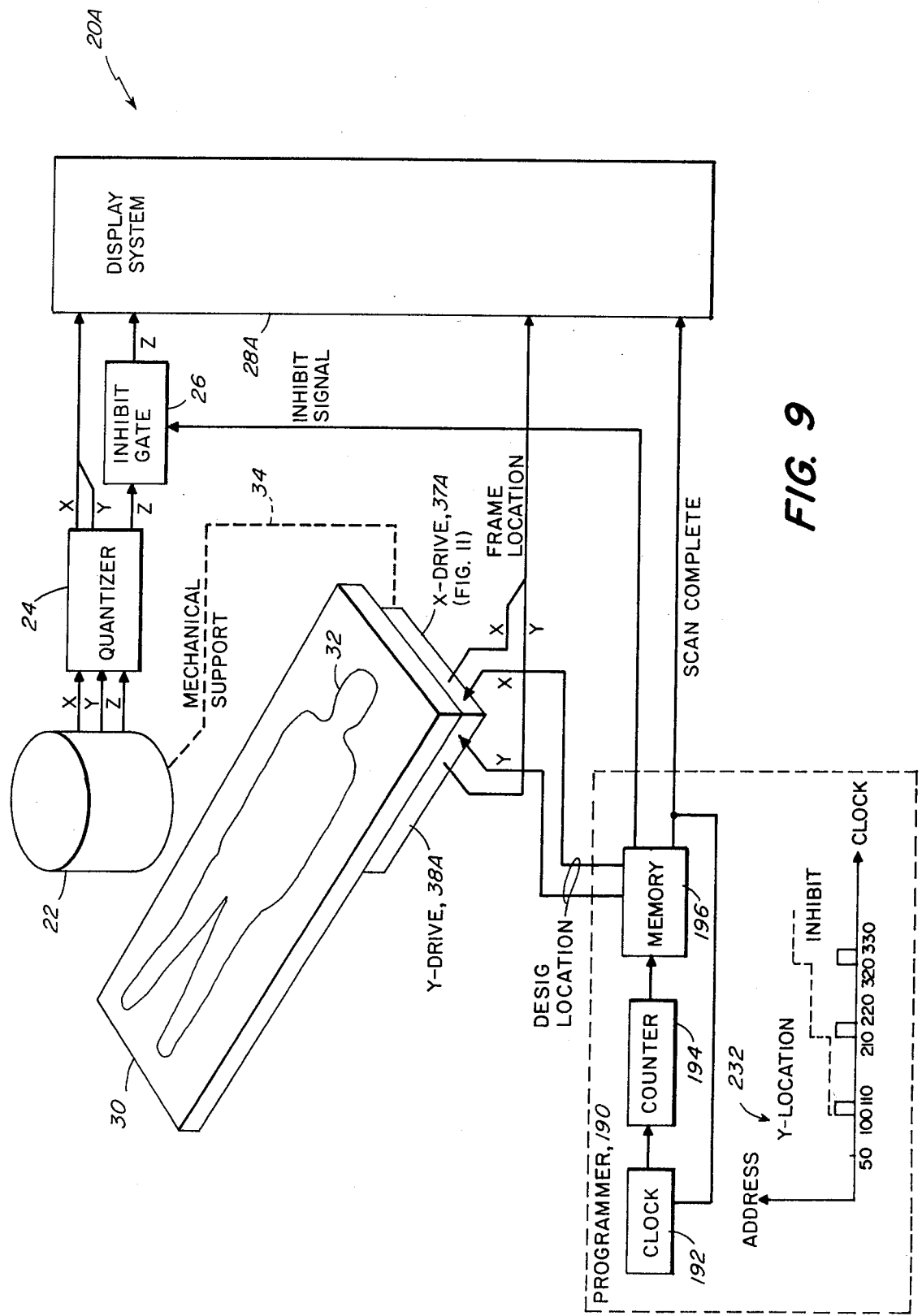
FIG. 9 is an alternative embodiment of the system of FIG. 1 utilizing a closed-loop control circuit in each of the drive units which position the bed.
Figure 10:
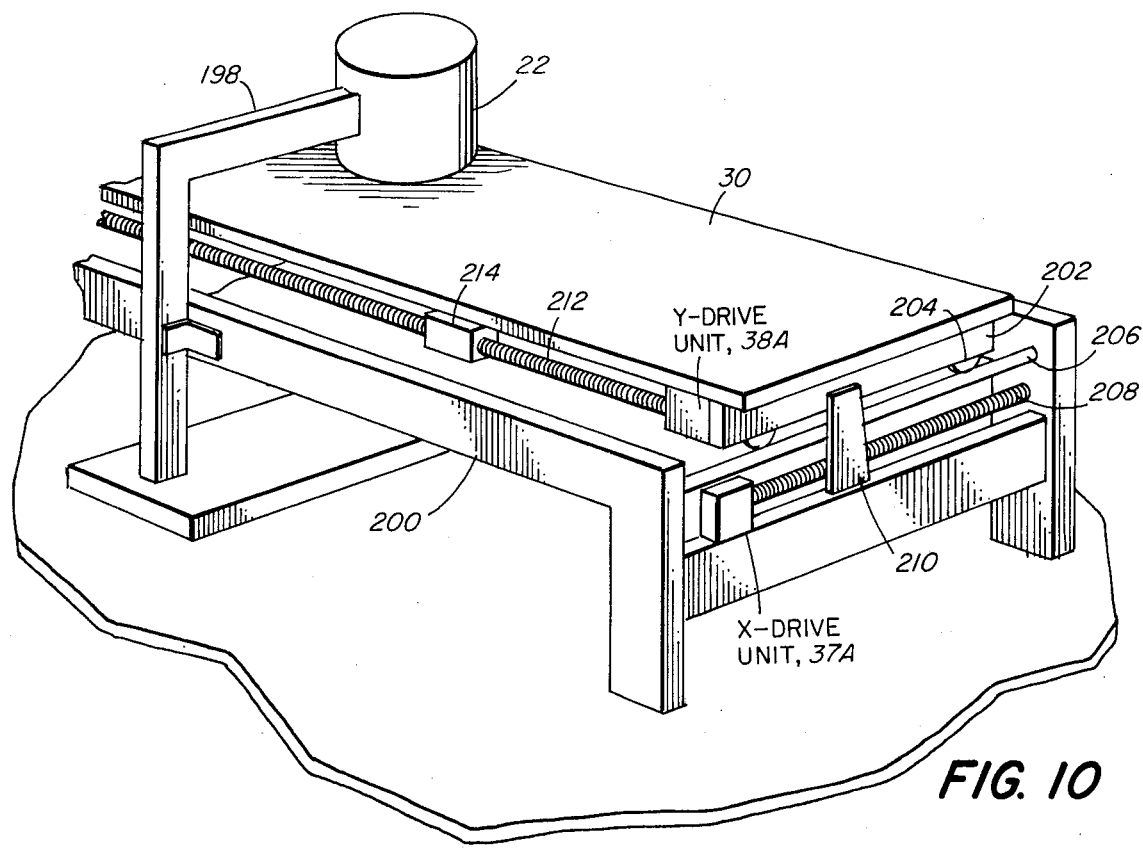
FIG. 10 is an isometric view of a portion of the bed including the drive units of FIG. 9.

Referring now to FIGS. 9, 10 and 11, there is seen an alternative embodiment of the invention wherein the drive units 37-38 of FIG. 1 which employ a control circuit having the aforementioned open loop configuration are replaced in the embodiment of FIG. 9 by drive units 37A-38A utilizing a control circuit with a closed loop configuration. The system of FIG. 9, identified by the legend 20A, is seen to comprise the camera 22, the quantizer 24, the inhibit gate 26 and the bed 30 which were previously seen in FIG. 1. Also, there is seen the display system 28A which has been described with reference to FIG. 8. The system 20A further comprises a programmer 190 which includes a clock 192, a counter 194, and a memory 196. The physical features of the mechanical interconnection, seen as the line 34 in FIGS. 1 and 9, are presented in FIG. 10 as an arm 198 secured to a frame 200 which supports the bed 30 as well as the drive units 37A-38A. The bed 30 including the drive unit 38A is secured by a frame 202 having wheels 204 which roll on a rail 206, the rail 206 being supported by the frame 200. The drive unit 37A is coupled via a worm gear 208 and a slider 210 to the frame 202 whereby, upon rotation of the worm gear 208 by the drive unit 37A, the slider 210 advances in the transverse direction. Since the drive unit 37A is secured to the frame 200, and the slider 210 is secured to the frame 202, the transverse movement of the slider 210 imparts a transverse motion to the bed 30 relative to the frame 200, and, hence, relative to the camera 22. The frame 202 also includes a rail and wheel arrangement (not shown in the figure) such as the rail 206 and the wheels 204, whereby the bed 30 can advance in the longitudinal direction relative to the frame 202. As seen in the figure, the drive unit 38A is coupled through a worm gear 212 to a slider 214 which is affixed to the bed 30. Thereby, upon rotation of the worm gear 212 by the drive unit 38A, the slider 214 advances to displace the bed 30 in the longitudinal dimension relative to the frame 202 and, hence, relative to the frame 200 and the camera 22.

In FIG. 11, the drive unit 38A is seen to include electronic circuitry coupled to a stepping motor 216 which is seen to be mechanically coupled via a dashed line 218 to the worm gear 208 of FIG. 10 and a shaft angle encoder 220 which produces the X coordinate of the frame-location signal on line 74 of FIG. 1, the frame-location signal in FIG. 11 being identified by the legend YL. The drive unit 38A is of the same configuration as is the drive unit 37A in FIG. 11 and, accordingly, the description of the drive unit 37A in FIG. 11 applies equally well to the drive unit 38A. The drive unit 37A is seen to comprise two comparators 223-224, an OR gate 226, a pulse generator 228, and a switch 230. In response to the X component of the designated location, as seen in FIG. 9, the comparators 223-224 compare the designated location with the actual location of the bed 30, in the X coordinate, as provided by the shaft angle encoder 220. As is well known, a shaft angle encoder provides an electrical signal which is a measure of the quantity of rotation of a shaft, such as that of the worm gear 208; and since the amount of rotation of the worm gear 208 is proportional to the location of the bed 30 relative to the camera 22, the electrical signal provided by the encoder 220 represents the X coordinate of the location of the bed 30.

When either the designated location, YD is less than or greater than the frame location, YL, the digital comparator 223 or the digital comparator 224, respectively, applies a signal via the OR gate 226 to the pulse generator 228 for activating the generator 228 to provide pulses to the motor 216. When the designated location equals the frame location, neither one of the comparators 223-224 is providing a signal to the generator 228 so that no pulses are supplied by the generator 228 for energizing the motor 216. The output signal of the comparator 224, which indicates that the designated location is greater than the actual location, is also applied to the switch 230 for switching the pulses of the generator 228 to the forward terminal of the motor 216 for driving the motor 216 in the forward direction. For example, the comparator 224 provides a logic 1 signal when the designated location is greater than that of the actual location. In the absence of the logic 1 signal, the switch 230 couples the generator 228 to the reverse terminal of the motor 216 for driving the motor 216 in the reverse direction. Thereby, when the designated location differs from that of the actual location, the stepping motor 216 is driven in either the forward or the reverse direction until the location of the bed 30 is in accordance with the designated location.

In operation, therefore, the system 20A of FIG. 9 provides for a step-wise scanning of the subject 32 to provide a composite image thereof, while inhibiting the imaging during the displacement of the bed 30 relative to the camera 22 between the successive steps of the scanning. The successive locations of the bed 30 relative to the camera 22 are designated by the memory 196 of the programmer 190. The counter 194 counts pulses of the clock 192, the counter 194 serving both to measure the duration of each image taken by the camera 22, and to address the memory 196 at the conclusion of each image to reposition the bed 30 relative to the camera 22. It is to be understood that, by way of alternative embodiments, the programmer 190 may be utilized to operate a drive mechanism (not shown) for physically moving the camera 22 while the bed 30 remains stationary in order to accomplish the step-wise scanning.

A graph 232 shown within the block identifying the programmer 190 portrays the operation of the counter 194. The horizontal axis of the graph 232 represents a counting of the clock pulses and is, accordingly, a measure of the elapsed time of the scanning operation. Assuming that the clock 192 provides an exemplary pulsing rate of one pulse per second to the counter 194, then the graph 232 shows that the Y coordinate of the location of the bed 30 is updated at a time of 100 seconds. Thus, the count of 100 serves as an address to the memory 196 which, in response to the address, designates a new value for the Y coordinate of the location of the bed 30. In addition, the memory 196, in response to the address of the count of 100, also signals the gate 26 to inhibit passage of the Z signals from the quantizer 24 to the display system 28A. The graph 232 shows that the inhibit signal is applied until a count of 110 is reached at which point the imaging proceeds. The designated location is retained until a time of 210 seconds at which time the memory 196, in response to the address of 210, designates a new location, the designation location signal being coupled to the drive unit 38A for energizing the motor 216 to reposition the bed 30. Again, the inhibit gate 26 receives the inhibit signal for a duration of 10 seconds, this being a sufficient time for the motor 216 to reposition the bed 30. The scanning and the addressing of the memory 196 continues in a manner following that taught with respect to the first graph of FIG. 7. In addition, the memory 196, in response to an address count of the counter 194 designating the end of the scanning operation, provides the scan-complete signal, previously described with reference to FIGS. 6 and 8, to the display system 28A for presentation of the composite image.

Figure 12:
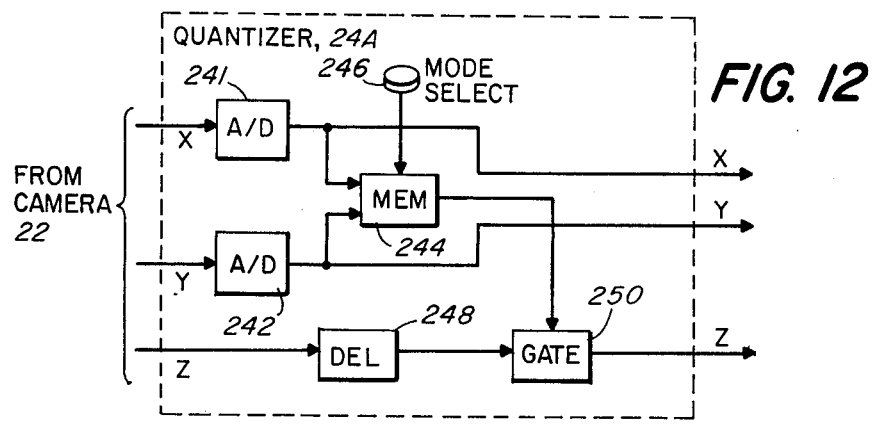
FIG. 12 is an alternative embodiment of the quantizer of FIG. 1 utilizing a memory for designating the shape of the boundary of an image.
Figure 13:
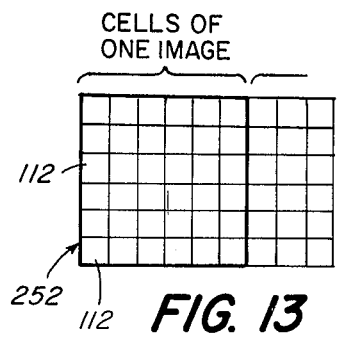
FIG. 13 shows a boundary of straight edges provided by the quantizer of FIG. 12.
Figure 14:
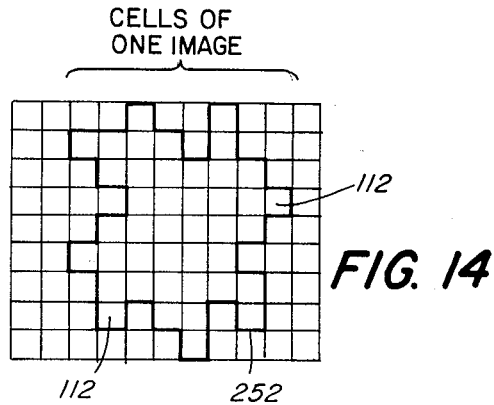
FIG. 14 shows an image boundary formed of staggered sections as provided by the quantizer of FIG. 12.

Referring now to FIGS. 12, 13 and 14, there is seen an alternative embodiment of the quantizer 24 of FIGS. 1 and 2, the embodiment of FIG. 12 being identified by the legend 24A. The quantizer 24A receives the X, Y and Z signals from the camera 22, and it transmits X and Y signals to the display 28 or 28A and the Z signal to the inhibit gate 26 as does the quantizer 24 of FIGS. 1 and 2. The quantizer 24A comprises two analog-to-digital converters 241-242, a memory 244 having a knob 246 attached thereto, a delay unit 248, and a gate 250. The converters 241-242 convert the analog X and Y signals to digital signals as do the converters 89-90 of FIG. 2. The pair of digital signals provided by the converters 241-242 serve as an address for the memory 244, the X and Y components of the address signal serving to address cells within the memory 244 corresponding to cells 112 of the image, the cells 112 being seen in FIGS. 13-14 as well as in FIG. 3 which was described earlier. In response to the addressing by the digital X and Y signals of the converters 241-242, the memory 244 applies a signal to the gate 250 to render the gate 250 conducting to Z signals of the camera 22 in the event that a cell 112 falls within the boundary of an image. In the event that the cell 112, as addressed by the converters 241-242, lies outside the boundary of an image, then the signal applied to the gate 250 by the memory 244 renders the gate 250 nonconducting to the Z signal from the camera 22. For example, the memory 244 may be a read-only memory (ROM) which is programmed to any desired shape or boundary, such as the boundary 252 of FIG. 13 or the boundary 254 of FIG. 14. The delay unit 248 delays the propagation of the Z signal from the camera 22 to the gate 250 a sufficient amount of time to permit the operation of the converters 241-242 and the memory 244, thereby insuring that the appropriate state of conduction of the gate 250 is established prior to the appearance of the Z signal at the input terminal of the gate 250.

In lieu of the moving boundary, provided by the quantizer 24 of FIG. 2 to accomplish a blending of the edges of the respective images, the quantizer 24A of FIG. 12 accomplishes a blending of the edges of contiguous images by means of a staggard boundary. By way of comparison, FIG. 13 shows a boundary of straight edges which would not, in the absence of the movement of the boundary of FIG. 2, provide for a blending of the edges of contiguous images. However, the staggard boundary of FIG. 14 provides for the blending of the edges of contiguous images since the configuration of the steps of the boundary 252 permit an interlocking of the boundary steps of one image with the boundary steps of a contiguous image. The memory 244 may be constructed of several sections, each having a set of storage cells for designating a different shape boundary, one of which may have a rectangular shape as shown in FIG. 13 to permit a comparison of operation of the system 20 of FIG. 1 both with and without the blending. The knob 246 coupled to the memory 244 enables an operation of the system 20 to select the desired section of the memory 244 and, hence, the mode of blending.

It is understood that the above described embodiments of the invention are illustrative only and that modifications thereof may occur to those skilled in the art. Accordingly, it is desired that this invention is not to be limited to the embodiments disclosed herein but is to be limited only as defined by the appended claims.

What is claimed is:

1. A radiographic system comprising:
    a camera for providing images of a subject;
    a support for supporting said subject in view of said camera;
    means coupled between said support and said camera for imparting a relative motion between said camera and said support, said motion being step-wise to provide a sequence of lateral displacements between said support and said camera alternating with a sequence of substantially different, laterally displaced, fixed locations of said support relative to said camera;
    means coupled to said camera for obtaining imaging data therefrom; and
    means coupled to said motion means for inhibiting a flow of said imaging data between said camera and said data obtaining means during each of said displacements.

2. A system according to claim 1 wherein said data obtaining means includes means for storing signals of radiographic events.

3. A system according to claim 2 wherein said storing means is photographic film, said film providing a composite image of said subject, said composite image comprising images provided by said camera at each of said locations.

4. A system according to claim 2 wherein said storing means comprises a memory and a summer coupled thereto, said summer summing together individual ones of said event signals having common coordinate addresses within an image provided by said camera.

5. A system according to claim 1 wherein said camera provides a sequence of images in correspondence with said sequence of fixed locations, said system further comprising means for blending the edges of contiguous images of said sequence of images.

6. A system according to claim 5 wherein said blending means includes means for repetitively off-setting the boundary of an image as said camera provides a sequence of signals of radiographic events.

7. A system according to claim 5 wherein said blending means includes means for stepping the boundary of an image as said camera provides a sequence of signals of radiographic events.

8. A radiographic system comprising:
(a) a camera means for providing a frame of image data of a subject;
(b) a support means for supporting said subject in view of said camera means;
(c) means coupled between said support means and said camera means for imparting a relative motion between said camera means and said support means, said motion being a sequence of discrete lateral displacements along a length of the frame, such camera means providing a frame of image data of a substantially different laterally displaced area of the subject at each one of such displacements; and
(d) means coupled to the camera means for obtaining the image data therefrom.

9. The system according to claim 8 wherein such sequence of discrete lateral displacements alternates with a sequence of fixed locations of said support means relative to said camera means and wherein such system includes means, coupled to the motion means, for inhibiting a flow of the image data between the camera means and the data obtaining means during each of said displacements and for passing said image data between said camera means and the data obtaining means during each of said fixed locations of said support means relative to said camera means.

10. The system according to claim 8 wherein said camera means includes means for blending edges of contiguous frames of image data.

11. The system according to claim 10 wherein such sequence of discrete lateral displacements alternates with a sequence of fixed locations of said support means relative to said camera means and wherein the blending means includes means for stepping the boundary of the frame of image data during each one of the said fixed locations of said support means relative to said camera means.

12. A radiographic system comprising:
(a) camera means, including a camera, for providing a frame of image data of a subject;
(b) support means for supporting said subject in view of said camera means; and
(c) and wherein such camera means includes means for electronically providing a sequence of frames of image data, each one of such frames being from substantially the same region of the subject, each one of such frames in the sequence of frames being obtained when said camera is at the same fixed position relative to said support means.

13. A radiographic system comprising:
a camera means for providing a frame of image data of a subject;
a support means for supporting said subject in view of said camera means;
means coupled between said support means and said camera means for imparting a relative motion between said camera means and said support means, said motion being a step-wise sequence of lateral displacements to provide a sequence of contiguous frames of image data; and
wherein said camera means includes means for blending edges of the contiguous frames of image data.

* * * * *